W. L. DUDLEY.
AIR WASHING DEVICE.
APPLICATION FILED MAY 14, 1920.

1,416,401.

Patented May 16, 1922.

INVENTOR:
William L. Dudley
BY
Pierre Barnes
ATTORNEY

UNITED STATES PATENT OFFICE.

WILLIAM L. DUDLEY, OF SEATTLE, WASHINGTON, ASSIGNOR TO WESTERN BLOWER COMPANY, OF SEATTLE, WASHINGTON, A CORPORATION OF WASHINGTON.

AIR-WASHING DEVICE.

1,416,401.  Specification of Letters Patent.  Patented May 16, 1922.

Application filed May 14, 1920. Serial No. 381,282.

*To all whom it may concern:*

Be it known that I, WILLIAM L. DUDLEY, a citizen of the United States, residing at Seattle, in the county of King and State of Washington, have invented certain new and useful Improvements in Air-Washing Devices, of which the following is a specification.

This invention relates to devices for washing and humidifying air in ventilating or drying systems.

The object of my invention is the provision of devices of this character having an efficient spray-head which may be regulated to enable the water in passing therethrough to be intermittently used for flushing or cleaning the same.

The invention consists in the novel construction, arrangement and combination of parts as will be hereinafter described and claimed.

Figure 1:
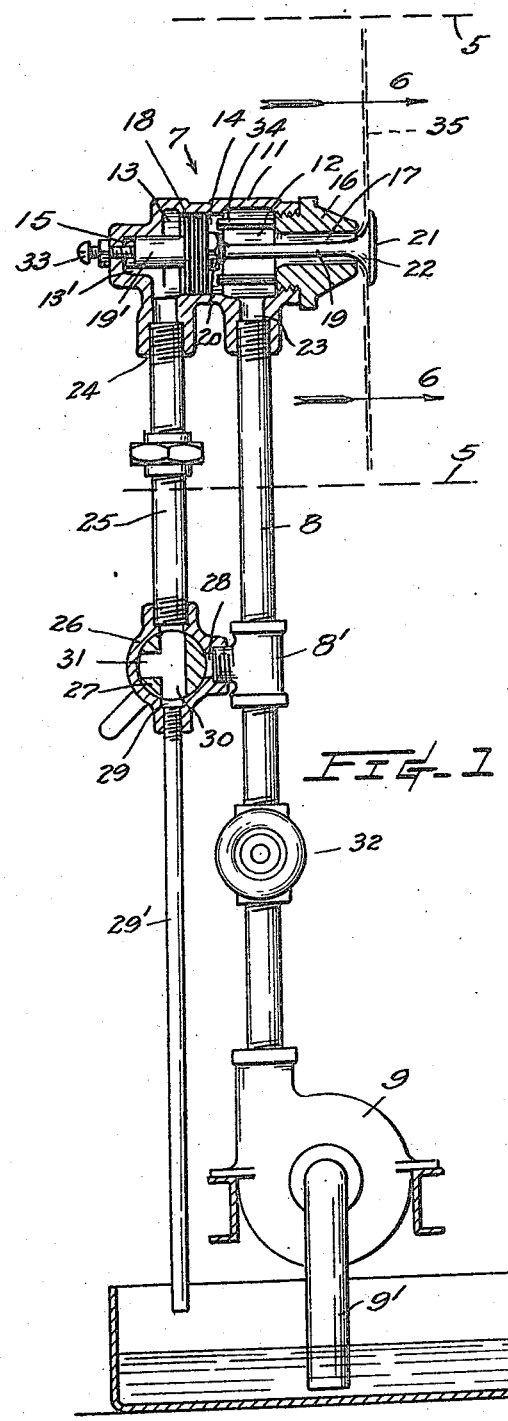
Figure 2:
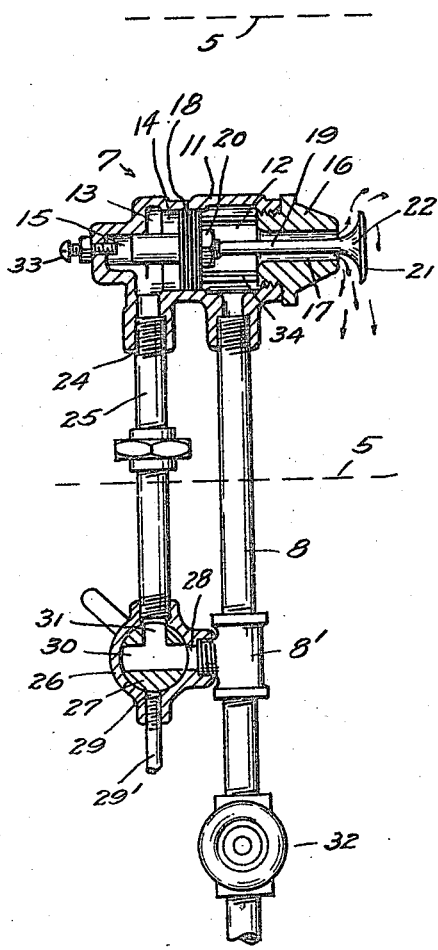

In the accompanying drawings,

Figure 1, is a view partly in side elevation and partly in longitudinal section of apparatus embodying my invention. Fig. 2 is a similar view of parts shown in Fig. 1 with the water-regulating devices illustrated in different positions from those in which they are shown in Fig. 1.

In said drawings, the broken lines 5 indicate the upper and lower walls of a duct through which air for ventilating or drying purposes is caused to travel in the direction denoted by arrows 6 in Fig. 1.

Positioned within said duct is a spray head, indicated generally by 7, which is connected by a water supply pipe 8 with a power driven pump 9 having its suction pipe $9^1$ extending into a pump 10 which receives the water issuing from said spray-head.

According to the present invention, the spray-head 7 comprises a hollow body 11 provided with two chambers 12 and 13 at opposite ends of a bore 14 arranged in axial alignment therewith and with a second bore 15 extending rearwardly from the chamber 13. In the front end of the body is provided a nozzle 16 having a central passage 17 leading from the chamber 12.

Fitting within the bore 14 is a piston 18 which is mounted upon a rod 19 between its enlarged cylindrical rear portion $19^1$ and a nut 20 threaded upon the rod. The rod extends through the passage 17 of the nozzle 16 and outside of the latter the rod is provided with a head or deflector 21 of a substantially conoidal shape with a concave inner face 22. The pipe 8 connects in a socket 23 of the body and communicates with the chamber 12. A second socket 24 affords communication between a pipe 25 and the chamber 13, and also by means of a pasageway $13^1$ with the bore 15 at the rear of the rod part $19^1$. The pipe 25 is connected to the casing 26 of a three-way valve 27. Said casing has a side connection at 28 with a T-fitting $8^1$ included in the pipe 8 and also an opening 29 wherefrom a drain pipe $29^1$ extends to the sump 10. The valve 27, as shown, is provided with a diametrically disposed passage 30 and a branch 31 disposed at right angles thereto.

A supplementary shut-off valve 32 may be employed in the pipe 8. 33 represents a screw threaded in the rear end of the body 11 to serve as an adjustable stop which is encountered by the rod part $19^1$ for retaining the deflector at a predetermined distance from the nozzle orifice under operating conditions as represented in Fig. 1. 34 represent fingers extending from the nozzle 16 into the bore 14 to be engaged by the piston to limit the outward movement of the deflector 21.

The action of the invention is as follows: Where the three-way valve 26 is disposed as in Fig. 1 the chamber 13 is evacuated of water, and the water delivered by the agency of the pump 9, in passing through the chamber 12 and passage 17 exerts pressure against the piston 18 to cause the deflector 21 to be held in the position in which it is shown to afford a relatively small annular opening through which the water is discharged.

The water thus delivered in a tubular stream to the deflector is influenced by the concave face 22 of the latter to be distributed in a thin disk-like form, denoted by broken lines 35 in Fig. 1, in a plane rectangular to the direction of the stream (indicated by arrows 6) of air which in passing through the water is freed thereby of dust and other foreign matter. The dust, etc., is accordingly saturated, more or less, with the water and falls therewith into the sump 10. The water is repeatedly used as above explained and the dirt therein has a tendency to accumulate in the nozzle orifice to obstruct the same.

To obviate such an occurrence, all that is requisite in the present invention is to move the three-way valve 26 into its Fig. 2 position resulting in water being admitted through the branch pipe 25 to the chamber 13 and the communicating bore 15 wherein the pressure of water acting respectively against the piston 18 and the rod part $19^1$ overcoming the pressure of water in the chamber 12 causes the deflector to be brought into the position whereat it is shown in Fig. 2. With the deflector thus moved away from the nozzle orifice the water flowing through the latter serves to dislodge any deposit or dirt which may have accumulated in the nozzle passage 17.

When the passage has been cleaned in this manner the valve 26 is returned to its Fig. 1 position to close the branch pipe with respect to the water supply and afford an outlet at 29 for the water from the rear of the piston 18, whereupon the water pressure in chamber 12 acts to restore the deflector into its operating position as shown in Fig. 1.

In the above described apparatus the spray head is provided with means under the control of a valve whereby the spray-head may be cleaned or flushed by water discharging therethrough.

The apparatus does not, moreover, require a pump to supply water for spraying or cleaning purposes as it is apparent that a supply of water under pressure from other sources will serve instead as, for example, a service pipe connected to a reservoir or tank.

What I claim is—

In apparatus of the character described, the combination of a spray-head consisting of a body provided interiorly with a bore and two chambers located at opposite sides thereof, a nozzle secured to one end of said body and affording an outlet for one of said chambers, a deflector for the discharge end of said nozzle, a rod rigid with said deflector and extending through said bore and both of said chambers into a guideway provided in the end of the body remote from said nozzle, a piston rigid with said rod within the body bore, said piston being arranged to co-operate with the portion of the rod within said guideway to maintain the deflector in axial alignment with the nozzle orifice, a pipe for supplying water into the body between said opening and the piston, a second pipe connected with the first named pipe and also with a chamber provided in the body at the opposite side of the piston from said opening, and a three-way valve provided in the second named pipe whereby water may be successively admitted into and withdrawn from said chamber for regulating the piston to cause said deflector to be respectively moved from and toward the discharge opening of the body.

Signed at Seattle, Washington, this 5th day of May, 1920.

WILLIAM L. DUDLEY.

Witnesses:
PIERRE BARNES,
EVA JEFFRIES.